United States Patent Office.

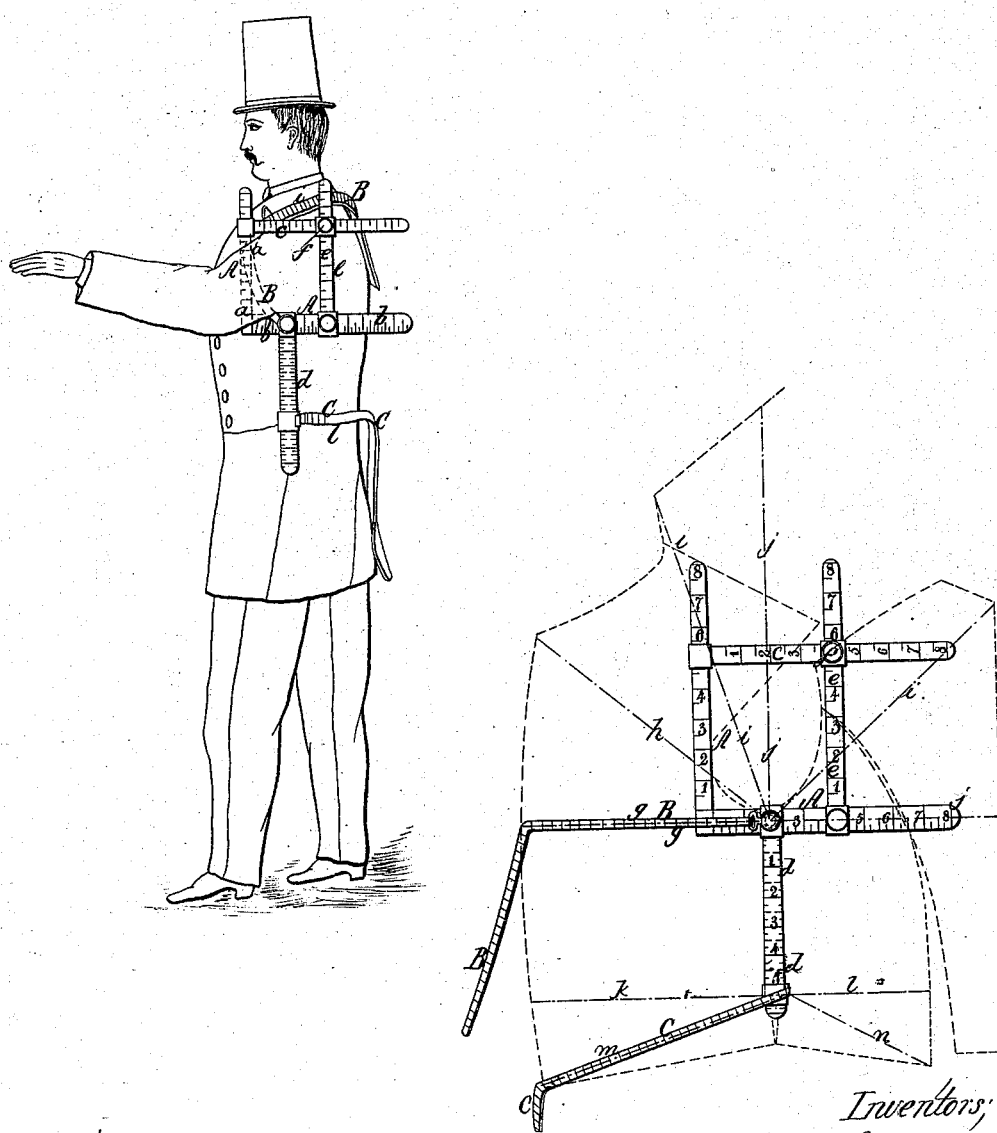

WILLIAM SINNOTT AND JOHN McNAUGHTON, OF BROOKLYN, NEW YORK.

Letters Patent No. 79,083, dated June 23, 1868.

IMPROVEMENT IN TAILORS' MEASURES.

The Schedule referred to in these Letters Patent and making part of the same.

TO ALL WHOM IT MAY CONCERN:

Be it known that we, WILLIAM SINNOTT and JOHN McNAUGHTON, of Brooklyn, in the county of Kings, and State of New York, have invented a new and useful Improvement in Tailors' Measures; and we do hereby declare that the following is a full, clear, and exact description thereof, which will enable others skilled in the art to make and use the same, reference being had to the accompanying drawings, forming part of this specification.

Figure 1 represents a side view of our invention, showing it applied to the body of a person.

Figure 2 is a side view of the same, showing it placed upon a piece of cloth to indicate how the measures taken from the person are transferred upon the cloth.

Similar letters of reference indicate corresponding parts.

This invention relates to a new device for aiding tailors in taking correct measures for gentlemen's coats, and consists in the use of an adjustable quadrangular frame, composed of metal bars, upon each of which a graduated scale is marked, in combination with a vertical bar, sliding upon the lower bar of the quadrangular frame, carrying an adjustable tape-measure.

This frame, when laid around the arm of the person whose measurement is to be taken, can be adjusted to give the exact width of the arm, and the distance from the shoulder to the arm-pit.

Upon the lower bar slides a bar, which can be adjusted to the centre of the lower bar, so that its upper end is directly in the arm-pit.

This bar is also graduated, and indicates the line of the side seam, measuring also the distance from the arm-pit to the waist.

A tape-measure, sliding on the last-mentioned bar, can be used to measure the width of waist from the side-seam to front and rear, also the distance to the front and rear button.

Another tape-measure, which is secured to the upper end of the sliding bar, can be used to measure the width of chest, height of neck, the position of shoulders, the balance of back, and width of breast, and thus all the measures required for the making of a coat can be taken by means of this device.

As the apparatus is firmly secured around the arm, it cannot get disarranged, and therefore all the measures taken will be very accurate.

The length of arm can also be measured by means of the tape which is secured in the arm-pit.

A represents a metal or other square, composed of two bars, $a$ and $b$, which form a right angle at their junction. $c$ is a metal or other bar, provided at one end with a sleeve, by means of which it is secured to the bar $a$, so that it can slide up and down on the same. $d$ is a bar having a sleeve at one end, by means of which it can be secured to the bar $b$, so as to slide upon the same. $e$ is a bar, having a sleeve at one end, by means of which it can be secured to the bar $b$, so as to slide upon the same. $f$ is a sleeve, which is fitted upon the bars $c$ and $e$, so as to connect the same, as shown.

Thus a quadrangular frame, $a$, $b$, $c$, and $e$, is produced, from the side $b$ of which the bar $d$ is suspended.

In each sleeve is arranged a thumb-screw, to enable the parts to be clamped in any desired position.

All the angles of the frame $a\ b\ c\ e$ are right angles, and the bar $d$ projects at right angles from the bar $b$.

Upon each of the bars $a$, $b$, $c$, $d$, and $e$ is marked a graduated scale, as shown in fig. 2.

B is a tape-measure, secured to the sleeve, which is formed on the end of the bar $d$.

C is a tape-measure, provided with a loop or sleeve at one end, whereby it is enabled to slide upon the bar $d$.

The operation is as follows:

The frame is fitted around the person's arm whose measurement is to be taken, and the bars $c$ and $e$ are moved toward the bars $b$ and $a$ respectively, so as to come close against the arm; the width of the arm will then be indicated on the bars $b$ and $c$, while the distance between the shoulder and the arm-pit is indicated on the bars $a$ and $e$.

The bar $d$ is then moved, so that it is equally far from the bars $a$ and $e$, when its upper end will be directly in the arm-pit.

The tape B is then used to measure from the arm-pit to the points to which the distance is to be found, and the tape $c$ is then also used for the same purpose.

The figures being recorded, the frame is removed from the arm, and is laid upon the cloth, (see fig. 2,) the upper end of the bar $d$ representing upon the cloth the place of the arm-pit. The distances taken by means of the tape B can be transferred, by means of the same, to the cloth.

Thus, the lines $g$, $h$, $i$, and $j$, in fig. 2, represent respectively the position of the tape B on the cloth, when the measures previously taken for the width of chest, width of breast to point of neck, position of shoulder to height of neck, and balance-line or square of back are measured.

The tape C is then moved on the bar $d$ to the height of waist, and by it are then transferred to the cloth the measures for the front and back width of waist, and the positions of the front and rear buttons.

The positions of the tape C, when transferring these measurements to the cloth, are respectively indicated by the lines $k$, $l$, $m$, and $n$ in fig. 2.

We claim as new, and desire to secure by Letters Patent—

The adjustable quadrangular frame, composed of the metal bars, on each of which a graduated scale is marked, in combination with the vertical bar $d$, sliding upon the lower bar $b$ of the quadrangular frame, and carrying the adjustable tape-measure C, as herein described, for the purpose specified.

WILLIAM SINNOTT,
JOHN McNAUGHTON.

Witnesses:
  WM. F. McNAMARA,
  ALEX. F. ROBERTS.